Oct. 22, 1963     B. A. FULTON     3,107,764
ONE-WAY CLUTCH
Filed Aug. 9, 1961     4 Sheets-Sheet 1

Bertram A. Fulton
INVENTOR.

BY
Attorney

Oct. 22, 1963  B. A. FULTON  3,107,764
ONE-WAY CLUTCH
Filed Aug. 9, 1961  4 Sheets-Sheet 2

Bertram A. Fulton
*INVENTOR.*

BY *Bertram A. Lypper*
Attorney

Oct. 22, 1963   B. A. FULTON   3,107,764
ONE-WAY CLUTCH
Filed Aug. 9, 1961   4 Sheets-Sheet 4

Bertram A. Fulton
INVENTOR.

BY
Attorney

United States Patent Office 3,107,764
Patented Oct. 22, 1963

3,107,764
ONE-WAY CLUTCH
Bertram A. Fulton, Lynnfield, Mass., assignor to Arthur D. Little, Inc., Cambridge, Mass., a corporation of Massachusetts
Filed Aug. 9, 1961, Ser. No. 130,276
4 Claims. (Cl. 192—41)

This invention relates to one-way clutches and more particularly to one-way clutches with friction wedge grippers.

This application is a continuation-in-part of my co-pending application, Serial No. 54,683, filed September 8, 1960, and now abandoned.

So-called one-way clutches are now extensively used in automatic transmissions in automobiles, in many household appliances, and in aircraft construction, as well as in a number of other mechanical devices where it is necessary to be able to transmit power in one relative direction only.

Clutches of this type are attractive because it should be possible to transmit loads across relatively large areas, and stresses could be made low in contrast to two point gripper types, for example, where loads are transmitted through line or point contacts. However, such clutches have previously been difficult to assemble due to the handling of an excessively large number of parts; they have not been capable of functioning as bearings during overrunning; and they have been relatively expensive to make.

The one-way clutches now most commonly in use may be one of three types: the cam and roller type, the sprag type, or the helical spring type. Although with long and intensive development these clutches have been made relatively satisfactory, they are comparatively expensive to manufacture and they possess certain inherent disadvantages. Among these disadvantages are, first, loads are transmitted through a line contact between a fairly small diameter roller or sprag and a race, resulting in very high local stresses. This then requires the use of premium steels which are carefully heat treated to withstand these conditions of operation. Second, extreme accuracy is required in the forming of the various pieces and this accuracy is difficult to obtain and increases the cost of the clutch. Finally, in the clutches of the prior art, wear occurs at the line contacts between the sprag and the race, or the cam and the roller, and this wear tends to quickly destroy the required accuracy in the clutch's operation.

It would be desirable to have a clutch of the character described, where the wear is distributed over large areas, that can be made economically and is not subject to reducing the accuracy of the parts during operation.

It is therefore an object of this invention to provide a one-way clutch in which loads are transmitted through areas in contact, thus eliminating high localized stresses. It is another object to provide a clutch of the character described, in the manufacture of which it is possible to use production techniques which can economically produce the accuracy required. It is another object to provide a one-way clutch of a novel design in which the wear actually improves the conformity between the race and the gripper and which will engage at low temperatures. Another object is to provide such a clutch which requires less torsional windup in loading and in which, therefore, less energy is stored. It is another object to provide a one-way clutch which eliminates a problem associated with other clutches; namely, the fact that axial motion between the races may occur during the time the clutch is beginning to lock up and to interfere with locking up. It is yet another object to provide a clutch of the character described which is capable of coping with occasionally very high overloads and which contains grippers capable of acting as their own bearings. These and other objects will become obvious in the following description.

The one-way clutch of this invention, which achieves these objects, can be generally described as comprising an inner race and an outer race in axial alignment defining a space therebetween, gripper means located and moveable within the space and engaging means adapted to maintain the gripper means in contact with the races. One of the races has a cylindrical surface (of circular cross-section) in contact with the surface of the gripper means, while the other race has a cam-shaped surface in contact with the gripper means. The gripper means, which is preferably but not necessarily a plurality of wedge-shaped members, has cylindrical and cam-shaped surfaces substantially corresponding to the surfaces of the races and is adapted to lock the inner and outer races into a fixed position with relation to each other. The cylindrical surfaces of the race and gripper are adapted to develop a higher frictional force than the cam-shaped surfaces of the other race and gripper means. The attainment of a differential in frictional force is achieved through either construction or design. Construction of the clutch to achieve the requisite locking is accomplished by the use of materials, the surfaces of which have different coefficients of friction; while the design of the clutch to achieve this requisite locking embodies the use of grooved surfaces. Of course, a combination of construction and design may be used in the one-way clutch of this inveniton.

This clutch may be further described in detail and shown in various modifications with reference to the accompanying drawings in which.

Figure 17:
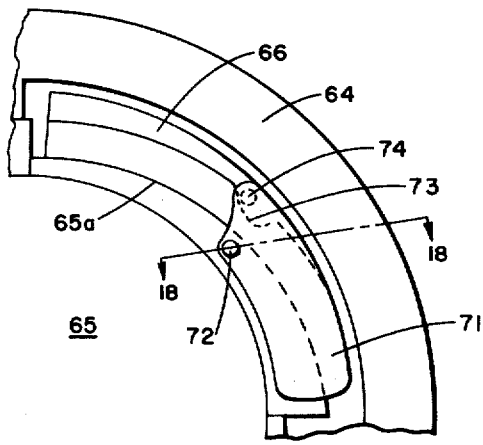
FIG. 17 is a top plan view of a modification of the clutch of FIG. 2.
Figure 18:
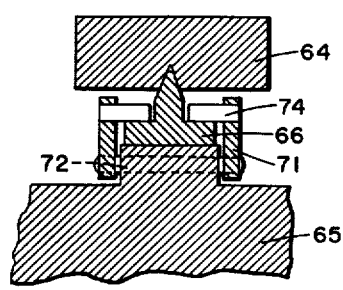
FIG. 18 is a cross-sectional detail view along line 18—18 of FIG. 17.

In the drawings, FIGS. 1–7 are directed primarily to various modifications of the one-way clutch of this invention which achieve the desired locking through construction, that is, through use of surfaces having different coefficients of friction. FIGS. 8–16 are directed primarily to modifications incorporating design features which achieve the desired locking. Of course, as will become apparent, these may be combined and many variations embodying both design and construction features are possible. Finally, FIGS. 17 and 18 illustrate the use of a pivoted mass, mounted on the inner race to reduce wear.

Turning now to FIGS. 1–7, it will be helpful to examine briefly the theory concerned with a one-way clutch having a cylindrical inner race, for through such an examination it is possible to illustrate the relationship between the coefficients of friction and the contour of the surfaces involved in the functioning of such a clutch which I have found necessary for satisfactory operation to attain the above-stated objects through construction.

Figure 1:
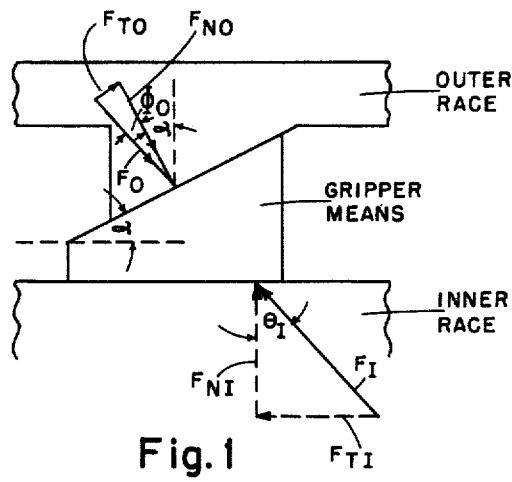
FIG. 1 is an idealized sketch of a portion of the gripper and segments of the races showing the forces acting upon the various engaging surfaces.

In FIG. 1 there is shown a gripper and a segment of the outer and inner races of an infinitely large diameter clutch. Using this clutch of infinite diameter simplifies the following theory and mathematical derivations.

In FIG. 1, $F_I$ is the resultant force on the gripper at the inner race and $F_0$ the resultant at the outer race. If the gripper is to be at equilibrium then $F_I$ and $F_0$ must be equal and co-linear, $$\therefore \alpha + \arctan \frac{F_{T_o}}{F_{N_o}} = \theta_I \quad (1)$$

In order to develop a load the gripper must slide on the outer race and therefore $$\frac{F_{T_o}}{F_{N_o}} = \mu_0 \quad (2)$$

the friction coefficient at outer race.

Define $\phi_0 = \arctan \mu_0 =$ friction angle  (3)

$$\therefore \phi_0 = \arctan \frac{F_{T_o}}{F_{N_o}} \quad (4)$$

In order to transmit torque the inner race must not slip so that $$\frac{F_{T_I}}{F_{N_I}} < \mu_I \quad (5)$$

or $$\theta_I = \arctan \frac{F_{T_I}}{F_{N_I}} < \phi_I \quad (6)$$

Substituting (6) and (4) in (1)

$$\alpha + \phi_0 < \theta_I \quad (7)$$

The above mathematical analysis of a one-way clutch having a cylindrical inner race illustrates the relationships which must exist between the engaging surfaces of the various elements in the clutch. The adherence to these relationships in the clutch of this invention will be pointed out below in the description of the various modifications of the clutch.

Figure 2:
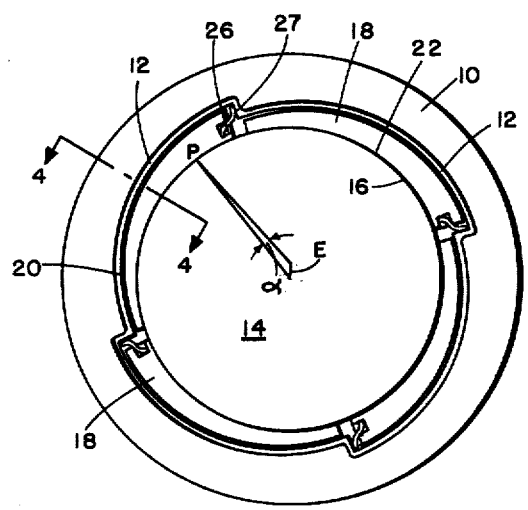
FIG. 2 is a top plan view of a one-way clutch constructed in accordance with this invention.
Figure 3:
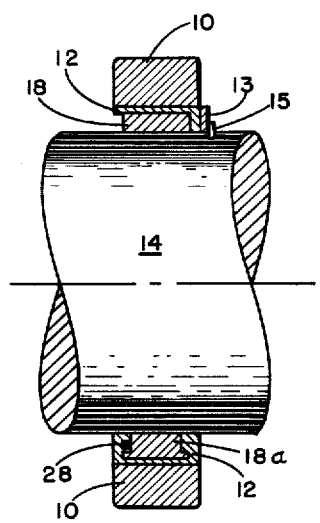
FIG. 3 is a side view, partially in cross-section, of the clutch of FIG. 2.

Turning now to FIGS. 2 and 3 there are shown two views of a typical embodiment of the one-way clutch of this invention. FIG. 2 is a top plan view partially broken away to illustrate several modifications of the engaging means. FIG. 3 is a side view partially in cross-section of the one-way clutch of FIG. 2.

In FIG. 2 the one-way clutch is seen to have an outer race 10 with a contoured inner surface which is coated with a layer of suitable material to form a smooth surface 12. Such a material may be an epoxy resin which may be cast directly and permanently onto the contoured surface of the outer race thus eliminating any accurate machining of this inner surface of the outer race. There is also provided a cylindrical inner race 14 having a surface 16 which engages the gripper surface. In the one-way clutch illustrated in FIG. 2 the gripper means is shown to comprise a number of wedges 18. The surface 20 of these wedges 18, which engages the inner surface 12 of the outer race 10, is so formed as to exhibit a low coefficient of friction between it and the coating 12 when compared to the coefficient of friction between the surface 16 of the inner race 14 and the corresponding engaging surface 22 of the wedge. As will be seen in FIG. 2, and in subsequently described FIGS. 5–8, the gripper means occupy substantially all of the space defined between the races, that is they occupy the entire space except for such part of it as is required for the engaging means and for the required restricted movement of the grippers. It will be observed that substantially all of the circular and cam-shaped area of the engaging gripper surfaces are in contact with one or the other of the races.

The outer race 10 and gripper means 18 are maintained on the inner race 14 by suitable means such as thrust bearing 13 and snap ring 15 as shown in FIG. 3. This figure also illustrates several cross-sectional modifications in the gripper means 18 and the manner in which coating 12 may be applied to outer race 10. Thus, for example, the gripper 18a may be made with flanges around which surface 12 of the outer race fits so as to hold the gripper means always in proper alignment for ease of assembly and disassembly.

In a typical embodiment of this one-way clutch the coating 12 may be a plastic material such as an epoxy resin, while the surface 20 of wedge 18 may be coated with a thin layer of another plastic material such as Teflon (polytetrafluoroethylene), which has a very low coefficient of friction with respect to the coating of the inside surface of the outer race. For example, if an epoxy resin and Teflon are used, the coefficient of friction which exists between these two surfaces is very low, typically of the order of 0.04. In contrast to this, the coefficient of friction between the outer surface of the inner race 16 and the engaging surface 22 of the gripper must be relatively high. Typically, these surfaces may be steel, they may be treated to increase the coefficient of friction, or they may be lined with well-known materials such as leather and the like.

Before discussing the application of the design of the clutch of FIG. 2 to the theory discussed above in connection with FIG. 1, it will be convenient to identify the remaining components of the clutch. In order to keep the gripper means properly aligned and in engagement with the outer and inner races, it is necessary to supply engaging means to accomplish such engagement.

One of the simplest types of engaging means is a spring such as illustrated by numerals 26 and 27, wherein a small cap 26 having a bent out section 27 is placed on the end of the wedge 18. The bent portion 27 engages the contoured shoulder of the inner surface of the outer race. Any such engaging means adapted to maintain the grippers in contact with the races are suitable.

The operation of the clutch may be described with reference to FIG. 2. Assume in this illustration that the inner race 14 is driving the outer race 10, a situation which can, of course, be reversed. Engagement under these assumed conditions is achieved when the inner race is rotated in a counterclockwise direction; disengagement when the inner race is rotated in a clockwise direction.

As the inner race begins to drive the outer race there is frictional engagement between the races and their corresponding wedge surfaces. Because of the relatively higher friction force at the inner race, the wedges move counterclockwise with the inner race and slide on the cam surface of the outer race. As the wedge slides on the cam surface, it is forced radially inward against the inner race and thus radial force increases. The cam surface is so designed that the radial force developed is great enough to allow the gripper to transmit more frictional force from the inner race without slipping. This frictional force is directly related to driving torque and thus, as this torque increases or decreases, the gripper slides on the cam and thus presses with greater or lesser radial force on the inner race to develop greater or lesser frictional force as required.

Disengagement is achieved, in this illustration, if the inner race is rotated in a clockwise direction. Under these conditions the wedges (gripper means) assume their original position in contact with the cam surface of the outer race and are held in position by the engaging means. The inner race is then free to rotate.

Reverting now to the design of the grippers, which in FIG. 2 take the form of a series of wedges, the clutch of that figure may be further described in connection with the theory given above. It will be seen from this theory that the degree of eccentricity defining the radius of the wedge-shaped grippers may be related to the coefficients of friction between the gripper and inner race surfaces and the gripper and outer race surfaces. In FIG. 2 the angle $\alpha$ is shown and it is defined as the angle formed by two lines joining any point on the periphery of the inner race with the centers of the two circles defining the inner race and the outer surface of the gripper. It will be appreciated that the size of this angle $\alpha$ varies slightly, depending upon the choice of the point P on the periphery of the inner race. However, as is pointed out above, the degree of eccentricity which may be represented by the distance E between the centers of the two circles may be related to the coefficients of friction, in that the tangent of the angle $\alpha$ must always be less than the difference between the coefficient of friction of the inner race and the gripper and the coefficient of friction of the outer race and the engaging surface of the gripper. In general practice, the distance E will not exceed 20% of the radius of the inner race. Thus, there is established a relationship between the coefficients of friction of the two engaging surfaces and the degree of eccentricity which is permitted in the design of the gripper means.

It should be pointed out that the outer surface of the gripper and the inner surface of the outer race need not be arcs of circles and could, for example, be portions of a spiral laid out to a base circle of radius E.

Figure 4:
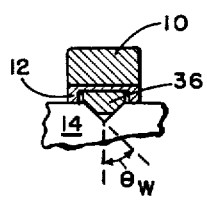
FIG. 4 is a cross-sectional detail view along line 4—4 of FIG. 2, illustrating a modification in the gripper and inner race engaging surfaces.

In connection with the theory set forth above, it can further be shown that if the surface of the gripper which engages the surface of the inner race is contoured as illustrated in FIG. 4, advantages are realized in the performance of the one-way clutch. Turning to FIG. 4, it is seen there in cross-section how the gripper 36 may be contoured to form a wedge-shaped surface to correspond to a groove-shaped surface in the inner race. In such a design, the angle $\theta_\omega$ enters into the calculation of the angle $\alpha$ and hence into the design of the gripper means used. It can be shown that if the gripper and inner race are contoured, then Equation 7 above must be modified to read $$\alpha + \phi_0 < \frac{\phi_I}{\sin \theta_\omega} \quad (8)$$

Since $\sin \theta_\omega$ is always less than one, it follows that a gripper formed in accordance with the modification of FIG. 4 allows greater values of the angle $\alpha$ to be used and also makes it possible for $\phi_0$ to equal $\phi_I$ if desirable. The arrangement in FIG. 4, in addition to allowing a greater degree of eccentricity which in turn leads to lower stresses through the clutch, makes the requirement for low coefficient of friction at the outer race somewhat less stringent than in the embodiment in FIG. 2. Moreover, the design in FIG. 4 of the inner race and gripper permits engagement during axial movement with respect to the inner race more readily than in the case of FIG. 2. As will be described below in connection with FIGS. 8–16, the use of a wedge on the circular surface of the gripper means, or inner or outer race, may entirely eliminate the requirement for a differential in coefficient of friction of the various surfaces involved.

It will be appreciated from the above brief presentation of theory that what is achieved through the use of surfaces having different coefficients of friction or the use of surfaces having matching grooves and wedges is the development of greater frictional forces between the surfaces where locking is to be effected.

In the operation of a one-way clutch such as illustrated in FIGS. 2–4, there will, in most cases, be a film of oil at the contacting surfaces and this means that the engagements of the surfaces will be made through this oil film. Moreover, it will be seen that the clutch overruns when the outer race rotates without building up centrifugal pressures between a race and gripper such as occurs in prior art one-way clutches. The operation of the clutch of this invention, without the building up of any appreciable pressures means that there is less heat developed, which in turn results in increased efficiency and less wear of the clutch parts. Moreover, it will be seen that the clutch such as illustrated in FIGS. 2–4 provides centrifugal disengagement where useful, and at the same time reduces the possibility of slippage due to axial motion of the races. The clutch is designed to have the proper relationship between the properties of the materials used on the engaging surfaces; and in the case of the design in FIG. 4, the stresses are reduced still further and the frictional properties required in the engaging surfaces are less drastic. Finally, it will be seen from the description of this clutch that it is capable of acting as a bearing during overrunning if the grippers are properly restricted, and that it has little stored energy.

Figure 5:
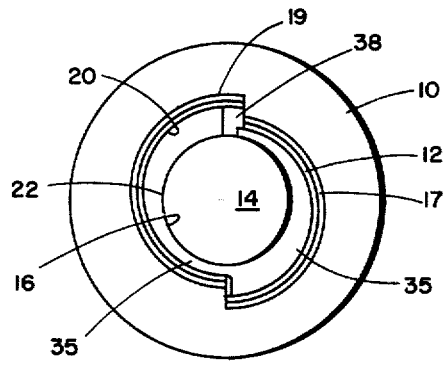
FIGS. 5 and 6 are top plan views showing modifications of the clutch of FIG. 2.
Figure 6:
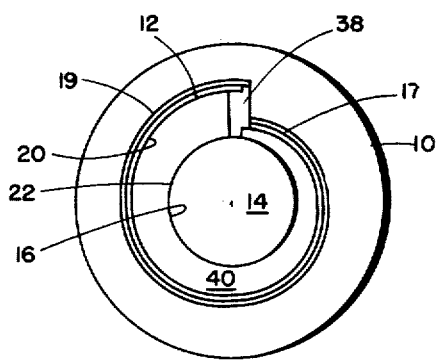

FIG. 2 illustrates the use of gripper means consisting of a multiplicity of wedges, and FIGS. 5 and 6 show how the number of wedges forming these gripper means may be reduced to two wedges 35, as in FIG. 5, or even to one single wedge 40, as in FIG. 6. As in the case of the clutch illustrated in FIG. 2, there are provided springs 38, and the engaging surfaces are designed to meet the same requirements; i.e., the coefficient of friction of the surface between the outer race and the gripper is small compared to the coefficient of friction between the inner race and the gripper surfaces.

FIGS. 5 and 6 illustrate another modification of the one-way clutch of this invention, in that they show how the outer race 10 may be cut from a flat plate and have welded to it at right angles to the plane of the outer race along edge 19 a strip 17, which is then coated on its inside surface to form the surface 12 which engages the gripper means.

Figure 7:
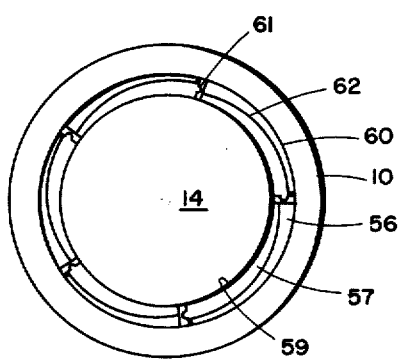
FIG. 7 is a top plan view of yet another modification of the clutch of this invention.

In FIG. 7, there is shown still another embodiment of the clutch of this invention. In this modification there is placed in the space defined between inner race 14 and outer race 10, the gripper means which comprises a series of sets of complementary wedges 56 and 57. Springs 61 are located between each of these sets of complementary wedges and function to hold the wedges in proper engagement with the surfaces of the inner and outer races. In this modification, the surface exhibiting the low coefficient of friction is that designated as 62 and is the engaging surfaces between the two complementary wedge-shaped gripper members. The engaging surfaces between the wedge and the outer race and its complementary wedge and the inner race exhibit a high coefficient of friction compared to the area of engagement 62. It is within the concept of the clutch illustrated in FIG. 7 that one or the other of the wedge sections be integral with its engaging race. Thus, for example, the surface of engagement represented by numeral 60 may be eliminated and the outer race would then have a contoured inner surface and the surface designated at 59 would alone have a high coefficient of friction. On the other hand, if wedge 56 and outer race 10 are not integral, the complementary wedge 57 may be integral with the inner race 14 at the surface designated 59, and the engaging surface 60 would then alone exhibit the high coefficient of friction required.

Figure 8:
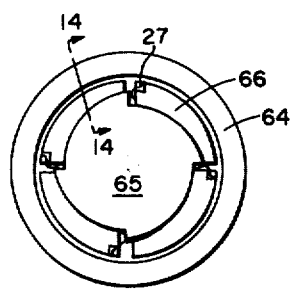
FIG. 8 is a top plan view of a one-way clutch representing a modification of the clutch of FIG. 2.

In the case of FIG. 7 where the inner gripper 57 is integral with the inner race, the surface of the inner race assumes a non-cylindrical contour and the outer race has a cylindrical contour. A one-way clutch having this arrangement and constructed in accordance with this invention is illustrated in FIG. 8. In this configuration of my one-way clutch, the inner race 65 has the cam surface, and with the outer race 64 it forms the necessary spacing for the gripper means 66.

Figure 12:
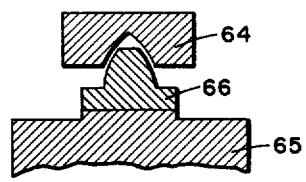
FIGS. 12–14 are cross-sectional detail views along line 14—14 of FIG. 8.
Figure 13:
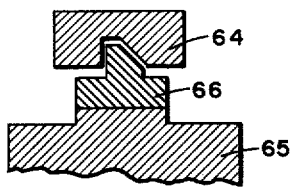
Figure 14:
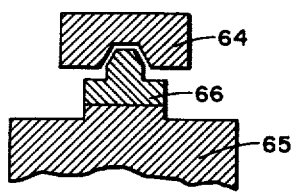

It has been noted above that the locking by the gripper means and the inner and outer races need not be achieved by the use of surfaces having different coefficients of friction. The discussion of FIG. 4 above briefly presented the theory associated with the use of grooved surfaces and pointed out that the difference in coefficient of friction between the surfaces could be eliminated by the use of a combination of wedged-shaped surface and an essentially corresponding grooved surface in contact therewith. FIGS. 4 and 9–11 illustrate a number of different surfaces suitable for construction of the clutch components of FIG. 2, while FIGS. 12–14 illustrate a variety of such surfaces suitable for construction of the clutch components of FIG. 8. Thus in FIGS. 4 and 9–11 the outer race has the cam surface, while in FIGS. 12–14 the inner race has the cam surface.

In FIG. 4 the gripper means 36 has a wedge-shaped surface, while the inner race has a corresponding grooved surface. The reverse is illustrated in FIG. 8, wherein the inner race has the cam surface. It will be seen that neither the wedge nor the groove need be truly V-shaped, but may assume a truncated configuration as in FIG. 9. In FIG. 10 the grooved gripper means 36 is formed in two parts, while the outer race 10 has an annular ring 37 adapted to screw therein to make assembly easy and to furnish a retaining surface to hold the gripper in place in the recessed portion of the outer race 10.

Figure 10:
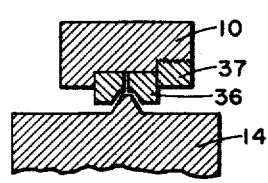
Figure 11:
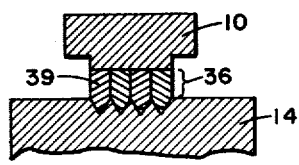

In FIG. 11 the gripper means is made up of a plurality of wedged-shaped members 39. This type of construction is particularly well suited to the construction of a clutch in which it would not be desirable to cut deep grooves in the inner race if such grooves were to detract from the over-all strength of that component. Thus, the use of a plurality of wedged-shaped members 39 making up the entire gripper means allows using a large surface contacting area without cutting a deep groove in the inner race surface. As in the case of FIGS. 9 and 10, the plurality of wedges of FIG. 11 could be used as the inner race surface with the plurality of grooves being in the gripper means; i.e., the arrangement could be reversed.

The modifications illustrated in FIGS. 12 and 13 relate to FIG. 8, wherein like numbers refer to like components of the clutch. These figures illustrate further that the surfaces need not be truly V-shaped, but may be slightly rounded (FIG. 12), unsymmetrical (FIG. 13), or truncated (FIG. 14). Of course, the components of these figures may also be made of two or more members such as in FIGS. 10 and 11, while the gripper means of FIGS. 9–11 may also be shaped as in FIGS. 12–14.

Figure 15:
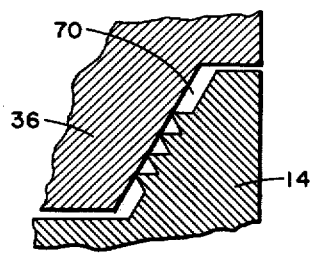
FIGS. 15 and 16 are cross-sectional detail views of a portion of the races and gripper means illustrating the use of oil grooves.
Figure 16:
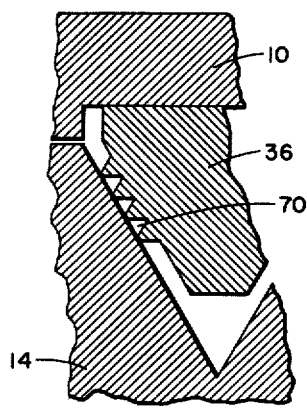

FIGS. 15 and 16 illustrate the use of oil channel 70, which may be desirable for allowing oil to escape during loading, promoting oil circulation during free-wheeling, and providing a safe place for dirt to lodge.

Figure 9:
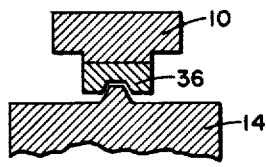
FIGS. 9–11 are cross-sectional detail views along line 4—4 of FIG. 2.

FIG. 15 is a fragmentary detailed drawing of a portion of the cross-sectional view of FIG. 9. In this modification, the contacting edge of the grooved portion of the inner race 14 is serrated or otherwise given channels 70 which permit the passage of oil or lubricants therethrough. In this modification, the lands of the surface of inner race 14 make the contact with the surface of the wedge of the gripper 36. In a similar manner, the modification in FIG. 16 is a fragmentary detailed drawing of a portion of the cross-sectional view of a clutch similar to that of FIG. 4. In this arrangement, the oil channels are in the surface of the gripper means 36 and the lands of this surface contact the surface of the inner race, leaving the channels 70 for oil passage.

When the cam surface in the clutch is associated with the inner race such as in FIG. 8, advantages in torque capacity and engagement ability can be gained, but these are partially offset by the disadvantage that during overrunning, with the inner race rotating, severe wear is encountered. This wear is due to the centrifugal force which presses the grippers heavily against the outer race. Such increased wear can, however, be reduced or eliminated by the modification shown in FIGS. 17 and 18. In this modification, a pivoted mass mounted on the inner race rotates with the inner race, producing a force on the gripper means such that it is out of contact with the outer race during overrunning.

In FIGS. 17 and 18 (which are top plan views and cross-sectional views of a portion of a clutch), inner race 65 has a cam surface represented by the numeral 65a. Attached to this inner race 65 and rotating with it is a pivoted mass 71 rotatably affixed to the inner race through a pivot pin 72. The gripper 66 is so contoured on both sides as to provide a cam surface 73 which engages cam follower pins 74 mounted on the pivoted mass 71. Centrifugal force acting through the center of gravity of the mass of the pivoted mass 71, when the inner race is rotating, produces a torque about the pivot point equal to the centrifugal force times the lever arm. This torque, in turn, produces a force, $F_T$, on the gripper equal to the torque multiplied by the mechanical advantage of the system. If this force, $F_T$, is greater than the opposing force developed by the centrifugal force of the gripper $F_G$, then the gripper will be moved down the cam and out of contact with the outer race. Thus, no wear can occur. If $F_T$ equals $F_G$, then the gripper will remain in contact, but the pressure between the gripper and the outer race will remain constant regardless of speed. If $F_T$ is less than $F_G$, then the pressure will increase with r.p.m. but will not increase to as high a value as it would without this feature.

A number of modifications are possible in the design and construction of the one-way clutch described herein without departing from the essential features of the invention, and the scope of this invention is not limited to the description and drawings.

I claim:
1. A one-way clutch, comprising in combination
   (a) a unitary race;
   (b) a unitary outer race co-axial with said inner race and defining a space therebetween;
   (c) gripper means located and movable within said space and occupying substantially all of said space; and
   (d) engaging means adapted to maintain said gripper means in contact with said races;
one of said races having a circular gripping surface concentric with said other race, said gripping surface being in direct area-to-area contact with a surface of said gripper means, the other of said races having at least one curvilinear cam-shaped surface in direct area-to-area contact with a surface of said gripper means, the said cam-shaped surface including a shoulder; said gripper means having circular and cam-shaped surfaces substantially corresponding to the surfaces of said races and in contact with substantially all of the circular gripping surface and substantially all of the curvilinear cam-shaped surface of said races, said gripper means being adapted to be limited by said shoulders upon relative rotary motion of said race in one direction and to lock said inner and outer races into a fixed position with relation to each other for the opposite direction of relative rotary motion of said races; one of the circular gripping surfaces having at least one groove and the other at least one corresponding wedge adapted to fit said groove whereby said circular gripping surfaces are capable of developing a greater frictional force than said cam-shaped gripping surfaces.

2. One-way clutch in accordance with claim 1 wherein said gripper means comprises a plurality of wedge-shaped members.

3. One-way clutch in accordance with claim 1 further characterized in that at least a portion of the surface of said wedge of said circular gripping surface is serrated.

4. One-way clutch in accordance with claim 1 wherein one of said circular gripping surfaces has a plurality of grooves and the other a plurality of corresponding wedges.

References Cited in the file of this patent
UNITED STATES PATENTS

| | | |
|---|---|---|
| 1,912,407 | Sahli | July 6, 1933 |
| 2,013,413 | Lazzarini | Sept. 3, 1935 |
| 2,956,656 | Becksted | Oct. 18, 1960 |
| 2,991,739 | Joa | July 11, 1961 |

UNITED STATES PATENT OFFICE
CERTIFICATE OF CORRECTION

Patent No. 3,107,764                          October 22, 1963

Bertram A. Fulton

It is hereby certified that error appears in the above numbered patent requiring correction and that the said Letters Patent should read as corrected below.

Column 8, line 51, after "unitary" insert -- inner --; line 72, for "race" read -- races --.

Signed and sealed this 28th day of April 1964.

(SEAL)
Attest:

ERNEST W. SWIDER

Attesting Officer

EDWARD J. BRENNER
Commissioner of Patents